Sept. 27, 1938. W. J. BECK 2,131,034
AUTOMATIC WEIGHING SCALE
Original Filed Feb. 28, 1930 6 Sheets-Sheet 2

Inventor:
William J. Beck
By his Attorneys
Edmund Congar Brown
Elizabeth C. Brown.

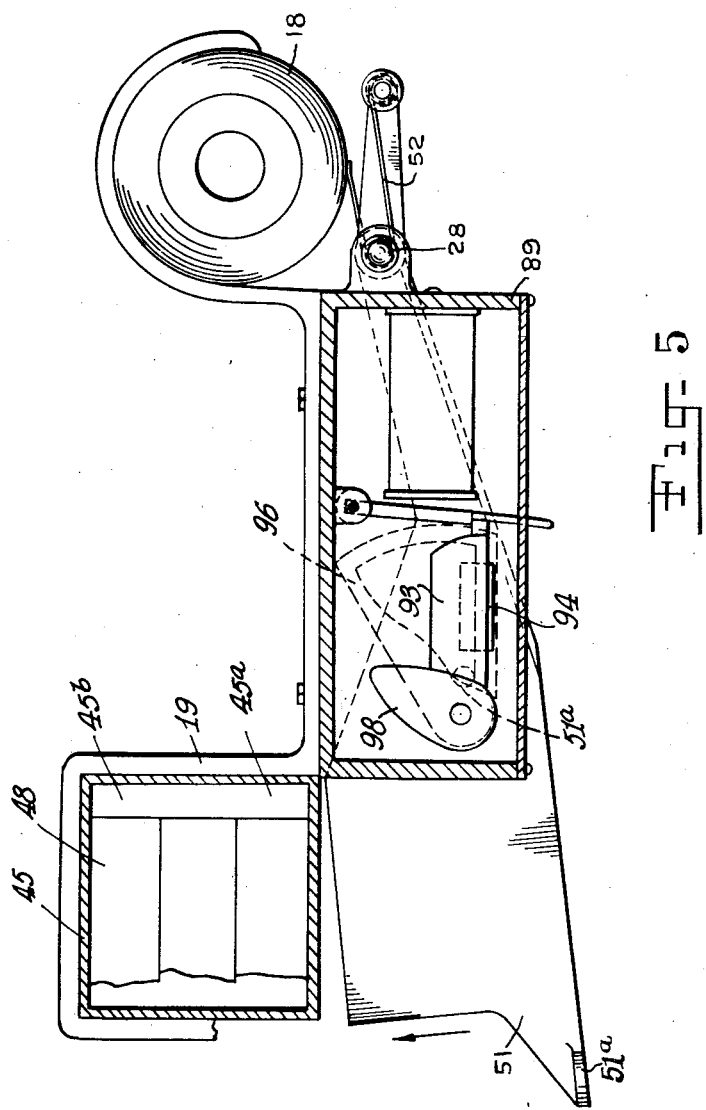

Sept. 27, 1938.　　　　W. J. BECK　　　　2,131,034
AUTOMATIC WEIGHING SCALE
Original Filed Feb. 28, 1930　　6 Sheets-Sheet 4

Inventor:
William J. Beck
By his Attorneys
Edmond Congan Brown
Elizabeth C. Brown

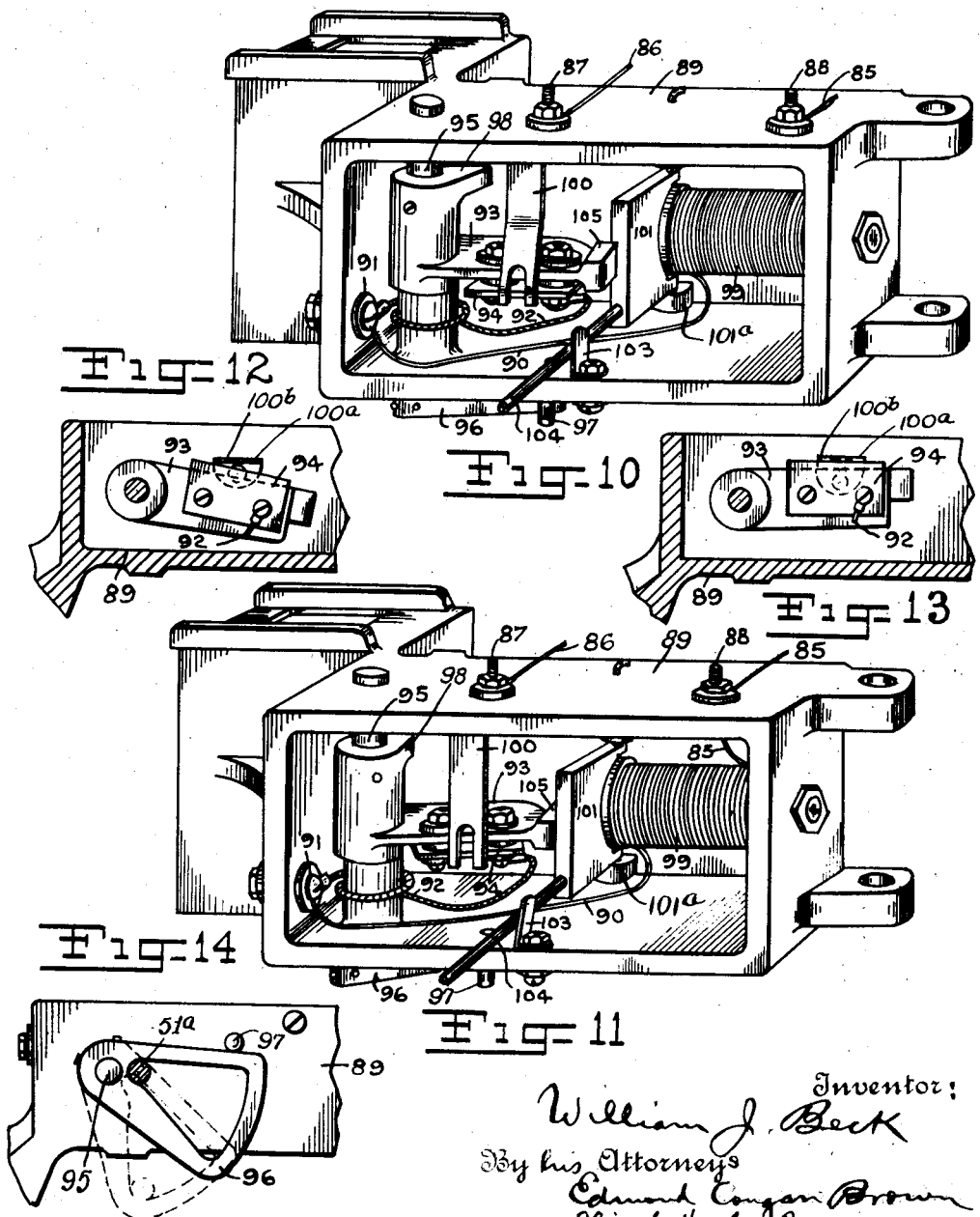

Sept. 27, 1938. W. J. BECK 2,131,034
AUTOMATIC WEIGHING SCALE
Original Filed Feb. 28, 1930 6 Sheets-Sheet 6
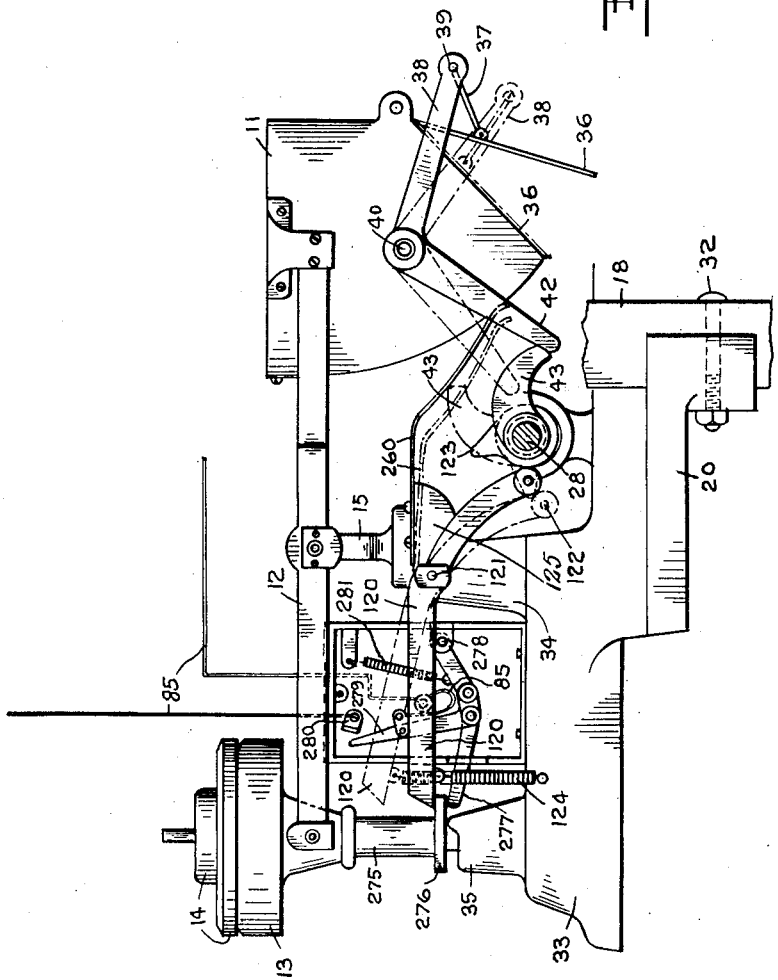
INVENTOR:
William J. Beck
BY his ATTORNEYS
Edmond Congon Brown
Elizabeth C. Brown Patented Sept. 27, 1938

REISSUED
DEC 1942

2,131,034

UNITED STATES PATENT OFFICE 2,131,034

AUTOMATIC WEIGHING SCALE

William J. Beck, Yonkers, N. Y.

Application February 28, 1930, Serial No. 432,077
Renewed July 5, 1935

12 Claims. (Cl. 249—42)

The invention relates to automatic weighing scales, for dividing off according to weight predetermined quantities of various substances.

The invention relates more particularly to that class of apparatus such as above referred to wherein the flow of material into or upon a receptacle placed at some suitable point of the apparatus, operates a swingingly mounted lever, which, through the medium of suitable electrical translating devices, controls the opening and shutting of a gate, which in its turn controls the passage of material to be weighed.

One of the principal objects of the invention is to provide an apparatus of the kind specified, which shall be simple and economical in construction, easy in manipulation and control, and positive, certain, rapid and accurate in its operation.

Other objects are to provide a weighing machine which may be started and stopped at will without interfering with any weighing operation which may be in progress and without causing any inaccuracy therein; to provide a machine in which materials of various sizes of particles may be weighed with equal success; and to provide an electrically operated machine in which the electrical switches are so constructed and operated that the machine will continue to function with accuracy in an atmosphere charged with dust such as is usually present in plants packaging foodstuffs and the like.

Further objects and advantages of the invention will be in part set forth in the following specification, and in part will be obvious therefrom without being specifically pointed out, the same being realized and attained by means of the instrumentalities and combinations pointed out in the claims hereof.

I am aware that apparatus for the automatic weighing of material has been known in said art, and that some forms of such apparatus have been subject to automatic control through the instrumentality of electrical devices, but, as is well known by persons familiar with such apparatus, many forms of the same have been subject to various objections and shortcomings, as for instance more or less uncertainty in the automatic operation of the devices for shutting off the flow of material after a predetermined quantity has passed upon the scales, and also, even where the operation of the device has been substantially certain, there has been a variation in the promptness of action, making the weighing not only inaccurate but extremely variable.

With the above-mentioned and other objects of the invention in view, the invention consists in the novel construction, arrangement, and combination of various devices, elements and parts, as set forth in the claims hereof, one embodiment of the same being illustrated in the accompanying drawings and described in this specification.

In the accompanying drawings,

Fig. 2 is a side view of a portion of the same, showing more particularly the weighing scales and the discharging mechanism connected therewith;

Fig. 3 is a perspective view of the material-receiving hopper of the apparatus;

Figs. 4 and 5 are detail views of portions of the apparatus, as hereinafter particularly set forth;

Figs. 10 and 11 are perspective views on an enlarged scale of the electro-magnetic mechanism for controlling the operation of the cut-off;

Fig. 12 is a view, looking upward, of the electrical contact mechanism forming part of Figs. 10 and 11, showing the contact just beginning to be opened;

Fig. 13 is a view similar to Fig. 12 but showing the contact fully closed;

Fig. 14 is a fragmentary view looking upward at the bottom of the casing shown in Figs. 10 and 11; and Fig. 15 is a view of the automatic switch and connected parts operated by the weighing means.

Figure 1:
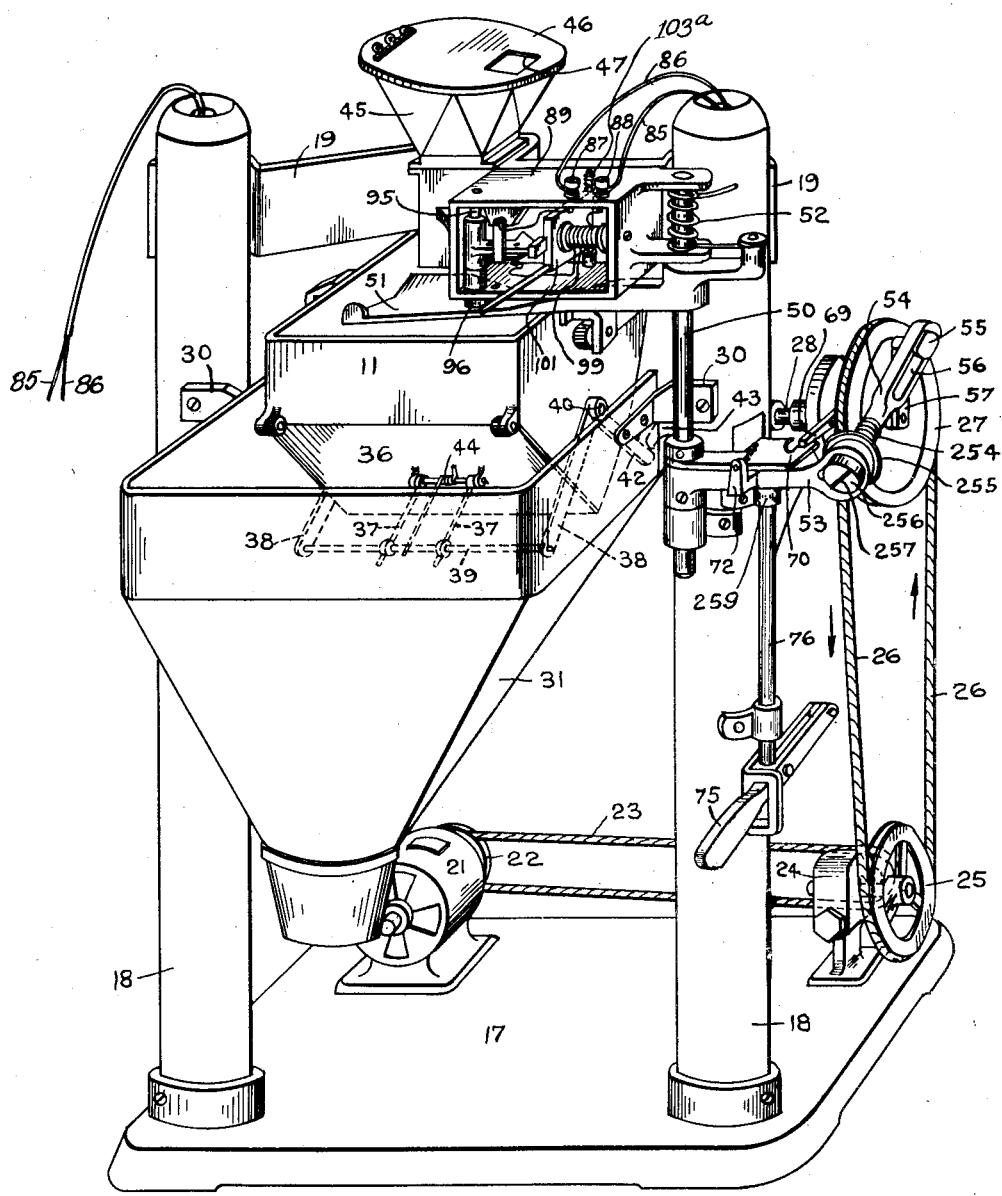
Fig. 1 is a perspective view of an automatic weighing scale constructed according to one of the embodiments of my invention.

In carrying my invention into effect in the embodiment thereof which I have selected for illustration in the accompanying drawings and for description in this specification, I provide a suitable base and supporting framework for the various moving and operative parts, the same comprising a bed-plate 17 upon which are supported a pair of upwardly extending pillars 18. Upon the base 17 is mounted an electric motor 21, on the end of the shaft of which is a pulley 22 around which passes a drive belt 23 which passes over a pulley in the upwardly extending fixture 24, the shaft of which bears a bevel gear which engages with a similar bevel gear on the pulley 25, around which passes a belt 26 which drives a pulley 27, which is loose on a shaft 28, but which may be operatively connected with said shaft as hereinafter described and thereby operate various moving parts of the mechanism, as hereinafter described.

Extending between the pillars 18 are various tie or bracing members of the framework, which also serve for the support of various parts of the mechanism. Near the top of the machine is a transverse member 19, which supports the feeding hopper for the material to be weighed and the automatic mechanism for controlling the discharge of material from the said hopper. Lower down upon the said pillars are members 30 which together support a discharge funnel 31 through which passes out the material after the same has been weighed. This material passes to a suitable receptacle or to a series of receptacles.

Still lower down, and extending across between the pillars 18, is a member 20, which cannot be seen in Fig. 1, but which is shown in the fragmentary side view Fig. 2. This member 20 is roughly speaking in the form of a Y, the two arms of which extend forwardly and are secured to the pillars 18 by bolts 32, and the rearwardly extending stem 33 serving as a support for the weighing scale, an upwardly extending member 34 bearing a pillar 15 upon which is pivotally mounted the scale-beam 12, and the upwardly extending member 35 standing under the weight-pan 13 of the scale in order to prevent too great a depression thereof.

The weighing scale itself, which is an essential part of my invention, may be, as to its operative parts and considered solely as a scale, of any suitable construction, the peculiarities of the same which adapt it for use as a part of my invention having relation principally to the scale-pan into which the material to be weighed is received, and to certain regulating, tripping and similar mechanism connected therewith, which will be hereafter described. It will be understood that certain parts of the conventional balance scale have been omitted for simplicity.

This scale is shown in side view in Fig. 2 of the drawings, and the scale-pan or receptacle for receiving the material to be weighed is shown on a larger scale in perspective in Fig. 1. This receptacle is designated 11, and is supported in any suitable manner on the scale-beam 12. The other end of the said scale-beam pivotally supports a weight-pan 13, which in Fig. 2 is shown supporting weights 14 therein. The position of the scale beam 12 which is shown in Fig. 2 may be designated as its initial position.

The weighing pan or receptacle 11 is open at the top, and is provided at the bottom at one side with a pivotally supported gate 36, shown in Fig. 2 in dotted lines in its closed position and in full lines in its open position. This gate is connected to a bar 39 by links 37 which are swingingly mounted on said bar 39, which extends across between two levers 38 and which are pivotally secured to the sides of the weighing receptacle 11 at 40 (see Figs. 1 and 2), from which levers, at said pivotal point, other levers 42 (which may be integral with the levers 38), extend at right angles to said levers 38.

These levers 42 extend downward and backward far enough to engage with cams 43 (best shown in Fig. 2), which are rigid on the shaft 28 and as they rotate therewith intermittently operate the levers 42 and 38 and the links 37 and thereby open the gate 36 and, after the cams 43 have passed the levers 42, the gate closes by reason of the weight of the parts connected therewith and also by the action of a spiral spring 44 (see Fig. 1) in a manner which will be well understood. The gate 36 having been completely closed, it is held securely in position owing to the interaction of the links 37 and levers 38, which, when the gate is closed, assume the position shown in dotted line in Fig. 2 and lock the gate against opening until the levers 42 are moved forward and the levers 38 swung upward, thereby drawing the gate 36 open.

In mechanism of the kind described, the material to be weighed is fed, preferably through a suitable feeding hopper having a gate adapted to open and allow the material to pass into the weighing receptacle and to be automatically closed when a predetermined weight of material has been delivered into the weighing receptacle and the scale beam thereby tipped. In the present invention, a feeding member of this kind for feeding the material is provided, which is shown in perspective in Fig. 3. This member comprises a body portion 45, and a top or cover 46, having an opening 47 for the admission of the material, and is provided with a series of sliding members 48 which may be secured in any desired position by set screws 49 operating in slots 49a. These members 48 may be raised or lowered as desired, for the purpose of controlling the rapidity of the flow of material through the receptacle 45. When the three members 48 are in the position shown in Fig. 3, no material whatever can pass, but when one or more of these is raised to a greater or less extent as desired, material is allowed to pass through the feeding hopper 45 and into the weighing receptacle 11 of the scales. The receptacle 45 is supported by the cross frame member 19, as will be clearly seen in Fig. 1, or in any other suitable manner.

The feeding hopper construction as shown in Fig. 3 and its position relative to the cut-off gate, as shown in Figs. 1 and 5, are important features of this invention. As to its construction, it will be assumed for purposes of illustration that the rectangular outlet of the body portion 45 is two inches square. This area is closed by the three sliding members 48, which may be inclined to an angle of 45° to the vertical, as shown. If, for example, the rate of flow desired requires an opening of one-quarter square inch this may be obtained by raising one of the sliding members one-half inch. The same opening might also be obtained by raising two slides one-quarter inch or all three slides one-sixth inch. It is therefore apparent that the same area of opening may be secured with three different aperture shapes which renders it possible to secure the desired rate of flow and at the same time provide an aperture of a suitable shape for the material being handled, which may vary from fine powder to large particles such as coffee beans.

As to the position of the feeding hopper relative to the cut-off gate, it will more fully appear hereinafter that, as shown in Figs. 1 and 5 the hopper 45 and the cut-off gate 51, which stops the flow therefrom, are so related that the direction of movement of the gate 51 is generally along the long axis of the opening in the hopper. For example, if the slides are all raised a half inch there will be an opening 45a in the hopper two inches long but only about .35 inch wide, because of the angular position of the slides. Now if the machine were weighing coffee beans, for example, and one or two beans should stick in the opening in the path of the gate, the closing of the gate would merely push them to the end of the opening at 45b and shut off the flow, probably dislodging the beans. If, on the other hand, the movement of the gate were along the short axis of the opening, the beans might wedge against one side and stop the gate, holding it open, thus allowing material to continue flowing. This would destroy the weighing in progress, the machine would have to be stopped and the obstruction removed. The invention therefore provides in this particular a machine which will give accurate weight even though obstacles may fall into the path of the cut-off gate.

The mechanism for intermittently controlling the flow of material from the hopper 45 into the weighing scale-pan 11 will now be described. Suitably journaled in the frame of the machine, as is clearly shown in Fig. 1, is a rock shaft 50, to which is rigidly secured a knife or cut-off gate 51, which is capable of swinging to and fro beneath the discharge vent of the hopper 45. A spiral spring 52 controls the shaft 50, tending to keep the knife 51 closed.

In Fig. 1 of the drawings this gate 51 is shown open, that is, in a position to permit material to flow from the hopper 45 into the weighing pan 11, but when the gate 51 is closed by the action of the automatic devices which operate when a sufficient amount of material has passed into the weighing pan, the opening from the receptacle 45 is entirely closed. The shaft 50 is provided near its lower end with a rigidly attached arm 53, which is operatively connected by the slotted link 54 to the pin 55 of the arm 57, which is secured to the shaft 28.

The link 54 is provided with a slot 56 which engages with a pin 55 on the arm 57. It will be seen that upon the rotation of the shaft 28 and the consequent turning of the arm 57, the arm 53 of the shaft 50, to which the link 54 is attached by a universal joint, is swung backward and forward, the gate or cut-off 51 being opened by its backward motion, the closing motion of the gate 51, being, however, produced by the action of the spiral spring 52, when electrically released as hereinafter described (see Figs. 1 and 5). That is, the slot 56 is so long that the pin 55 only operates to move the gate 51 to the open position.

Because of the design of the electrical devices hereinafter described, it is necessary that this opening of the gate 51 be rigid and exact, with a minimum of friction present to impede free closing of the member 51. Therefore in my invention a universal joint, shown in Figs. 1 and 6, having a combination of a ball and socket held in place by a spring 254 and a suitably formed shield or washer 255, is provided. The ball in this case comprises a screw-head 256, having a spherical bearing face and provided with a slot 257 for adjustment. This type of universal joint prevents the development of lost motion through wear which would make uncertain the engaging of the parts 105 and 101 (see Figs. 10 and 11). The said engagement is positive and easy of adjustment, yet offers comparatively little friction when the gate 51 closes.

In this machine the tipping of the scale causes the unlatching of the gate 51 which immediately stops the flow of material. When this happens other mechanism is at once brought into operation to return the scale beam 12 to level position and hold it there, to steady the weighing receptacle 11, to open its gate 36 and thus discharge its contents, to close the said receptacle gate, release the scale beam, free the weighing receptacle, and open the cut-off gate, to perform the next weighing operation. The above recital is not, however, intended as a statement of the sequence of operations. The mechanism for performing these operations will now be described.

Figure 6:
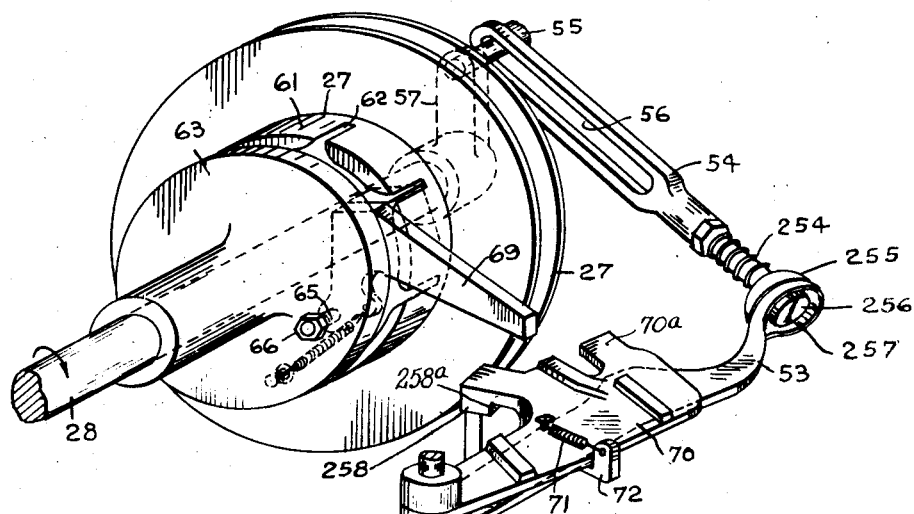
Fig. 6 is a perspective view on an enlarged scale of the portion of the machine shown in Fig. 4.
Figure 7:
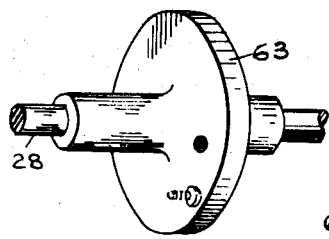
Figs. 7, 8 and 9 are detail perspective views of parts of Fig. 6, all hereinafter particularly described.
Figure 8:
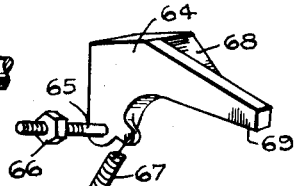
Figure 9:
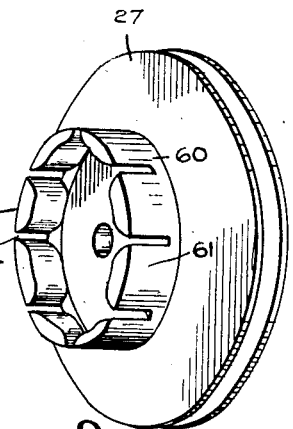

As previously stated, the pulley 27 is loose on the shaft 28 and is driven continuously by the belt 26. Associated with the pulley 27 is a clutch for operatively connecting it to shaft 28. When this clutch is engaged the shaft 28 is rotated. Fig. 6 shows the clutch assembled and Figs. 7, 8 and 9 show its parts. Referring to Fig. 9, on the face of pulley 27 is a cam gear 60 comprising a series of teeth 61 between which are notches 62. Secured to shaft 28 is the disk 63 shown in Fig. 7, between which and the cam gear 60 is a space. Pivotally mounted by the bolt 65 and nut 66 on the disk 63 is a pawl 64 having a shoulder 68 to engage the notches 62 of the cam gear and a finger or lever 69 which extends out through the said space. A coil spring 67, the ends of which are respectively secured to the pawl 64 and the disk 63, normally urges the pawl against the cam gear 60, which is the engaged position of the clutch. When engaged, the pulley, pawl and disk rotate together. If an impediment is placed in the path of the lever 69, the clutch will be disengaged when the lever strikes it and the rotation of the disk and shaft will stop immediately. No novelty is claimed for the clutch per se but its operation must be understood to comprehend the operation of the machine.

In the normal operation of the machine it is desired to disengage the clutch while the weighing receptacle is being filled and to engage it as soon as the cut-off gate 51 closes, so as to cause the shaft 28 to revolve and actuate the mechanism to carry out the several operations described above. As soon as the cut-off gate 51 is opened it is desired to disengage the clutch. The mechanism for accomplishing this is as follows: Referring to Figs. 1, 4 and 6, on the lower end of rock-shaft 50 is a swinging arm 53 secured against rotation on the shaft. It is through this arm 53 that the motion from the arm 57, transmitted through the link 54, is applied to rotate shaft 50 to open gate 51. Rotatably mounted on shaft 50 and lying upon the arm 53 is a holding-plate 70. This holding-plate is connected to arm 53 by a spring 71 attached to the lug 72 on the arm 53. It will be seen that lug 72 will push against plate 70 to move it toward the finger 69 of the clutch. With the cut-off gate 51 open, the lip 70a on the right edge of plate 70 extends in the path of finger 69 which engages it as it rotates, thus releasing the clutch. Ordinarily when gate 51 closes, plate 70 will be drawn out of the path of finger 69 through the medium of spring 71. If, however, plate 70 is held in place under finger 69 by other means, the gate can close and arm 53 can move forward, without releasing finger 69 and so engaging the clutch, by reason of the elasticity of spring 71. Such means for holding plate 70 in position are provided in the hand-lever 75 and rod 76 which cooperates with a holding lug 258 on plate 70.

The purpose of the hand lever 75 is to enable the operator to temporarily stop the operation of the machine without shutting off the power and without interfering with any weighing in progress or the accuracy of such weighing. This stopping mechanism can be actuated only at certain times during the cycle of operations as will be clear from the following description of its construction. Referring to Fig. 6, the parts are shown in such position that the cut-off gate 51 (not there shown) is closed, the clutch is engaged and shaft 28 revolving. In this position the operation of the machine cannot be stopped by lever 75 because the end of rod 68 strikes the bottom of stop 258 and cannot be raised. This is assured by reason of the fact that the stop 258 in this position is directly over the hole in bracket 259 (see Figs. 1 and 4) in which rod 76 is journaled. As the rotation of shaft 28 continues and the link 54 draws the arm 53 and plate 80 toward the clutch to open gate 51, the stop 258 uncovers the rod and it can be raised, whereupon it engages the face 258a of stop 258 and prevents the return of plate 70 with arm 53 when the gate 51 next closes. It is apparent from the foregoing that this stopping mechanism can only be operated when the gate 51 is open and material is discharging into the scale and that upon closing of the gate 51 the clutch will remain disengaged and no further operations will take place. In this condition the weighing receptacle 11 is charged with a quantity of accurately weighed material.

The usual reason for temporarily stopping the machine in this condition is that there is no package under the funnel 31. Heretofore in machines of this character such temporary stopping has been accomplished by interposing some separate member in the path of the clutch finger 69 which permitted it to move slightly past its normal stopping position. This permitted a slight revolution of shaft 28 with the result that the door 36 of the weighing receptacle 11 would open slightly and some material would spill out before a package could be placed under the funnel 31 and short weight and waste would result. By the means above described it will be noted that the clutch is always disengaged at exactly the same point, whether this is done automatically during continuous operation or upon temporarily stopping the machine.

This temporary stopping by the means just described is not limited in its application to manual operation as by the lever 75 shown in the embodiment described.

To enable the machine to perform its function of delivering accurately weighed batches of material, certain electrical devices are employed to release the cut-off gate 51 as soon as the scale tips. This causes a cessation of the flow of material into the weighing receptacle which is practically simultaneous with the tipping of the scale. It is easily seen that any delay between the tipping of the scale and the closing of the gate will result in overweight and that any variation in the time relationship of these events will result in variable weights. To convey a clear picture of the accuracy of the timing required it is only necessary to recite the following facts: Weighing machines such as that here described operate at an average rate of 30 weighings per minute, which allows 2 seconds for each weighing. Roughly, 1 second is available to complete the weight and 1 second to discharge the material and return the parts to position for the next weight. Should the machine be operating to weigh 16 oz. drafts then the feed orifice has 16 oz. passing through it in 1 second. The generally accepted tolerance in commercial weighing is $\frac{1}{16}$ oz. unit of error. In 16 oz. there are 256 of these units. It is obvious, therefore, that if the electric devices for releasing the cut-off gate 51 delay but 1/256 of a second there will be an overweight of one unit of error. A delay of 1/128 of a second will give two units of error etc.

While the practice of cutting off a stream through the instrumentality of electrical devices is very old in the weighing art, the difficulty has always been to maintain uniform timing of the required degree of accuracy. One reason for this has been that electrically operated weighing machines contain make-and-break contacts which spark on opening and these machines must operate in atmosphere laden with dust from the materials being weighed, which are frequently foodstuffs. This dust rapidly causes carbon to accumulate on any contact which sparks and such carbonizing invariably and in a short time will destroy the accuracy of weighing. By the means about to be described this difficulty has been entirely obviated by a simple yet rugged mechanism and machines built in accordance with this invention have been found to run indefinitely without losing their accuracy.

Referring to Figs. 1, 10 and 15, the electric circuit, which may be collectively termed the tripping circuit, begins with the cable containing the wires 85 and 86 from a suitable source of power. This cable passes down through the left supporting pillar 18, out of it underneath the scale support 20 and thence under a switch mounted on member 20 (Fig. 15). The switch contacts 279 and 280 are inserted in wire 85 which is then carried up and out through the right pillar 18 to binding post 88 (Fig. 10) with the wire 86 which goes directly to binding post 87, the said binding posts being mounted in insulating bushings in the top of the casing 89.

The construction and operation of the switch just referred to will now be described. Referring to Fig. 15, it will be seen that the weight pan stem 275 bears a collar 276, against the under side of which abuts the lever 277 which is pivotally mounted at 278. Rigidly attached to lever 277 at about its mid-point is a contact arm 279, insulated from the lever and connected to an end of wire 85 which is looped to permit free movement. The other end of wire 85 is electrically connected to the contact 280 mounted on the wall of the switch box and insulated therefrom. The lever 277 is urged upwardly by the coil spring 281. Therefore, when the weight pan 13 rises and with it the collar 276, the switch will close and when it descends the switch will open, in which position it is shown in Fig. 15. The spring 281 of course tends to raise the weight end of the scale and must be compensated for by a small addition to the weight.

The switch mechanism just described may be referred to collectively as the first or scale switch and its function obviously is to close whenever the scale receives its quota of material and tips. As the sole function of the scale switch is to close the circuit, which is broken elsewhere before the scale switch opens, no sparking takes place between its contacts which therefore remain clean.

Referring particularly to Figs. 1, 10 and 14, the cut-off gate 51 has extending from its upper side a stud 51a, shown in section in Fig. 14, which engages with a loop member 96 fixed on a shaft 95 journaled in suitable bearings in the casing 89. A stop 97 limits the forward movement of member 96. The position of the parts in full lines in Fig. 14 is that assumed when gate 51 is open, and their position when gate 51 is closed is shown in dotted lines.

Inside the casing 89 and also fixed on shaft 95 is a swinging arm 93 on the end of which is a toe 105 which engages the edge of the armature 101 of the electro-magnet 99. Armature 101 is pivoted on bearings 101a. It is normally urged away from the magnet 99 by a spring 103 (Fig. 10) which presses against the hand operating rod 104. However, any suitable spring arrangement may be used, such as the spring 103a (Fig. 1) acting on the top pivot. The hub for arm 93 has an integral stop 98 which is so positioned as to engage the side wall of casing 89 to limit the rotation of the shaft 95 and so prevent the arm 93 striking the casing.

The arm 93 has a further important function as part of a circuit breaking switch for which purpose it carries a contact member 94, electrically insulated from it, which engages with a spring contact 100, shown in the drawings as bifurcated to form two contact points to engage member 94.

Reverting now to the electric circuit, it will be traced from the binding posts 87 and 88. The wire 85 leads to one end of the coil of the electromagnet 99, the other end of the coil being connected at the insulated binding post 91 to wire 92 which is attached to the contact 94. The spring contact 100 is electrically connected to binding post 87 to which wire 86 is connected, and thus the circuit is completed.

The operation of the parts of the machine just described will now be explained. When the gate 51 is opened by the rotation of shaft 28 and arm 57, the stud 51a travels in the loop 96 from the dotted to the full line position (Fig. 14) and striking the side of the loop 96 moves it from the dotted to the full line position. Just before the loop 96 strikes the stop 97 the toe 105 on arm 93 latches over the edge of armature 101, the arm 93 and loop 96 rotating together on shaft 95. In this position the gate is locked open as the form of loop 96 is such as to hold the stud 51a. Therefore, gate 51 can be closed only by unlatching armature 101 and toe 105.

It will be noted that there are two switches in the electric circuit, the scale switch and the switch in the casing 89. As shown in Fig. 10, with gate 51 open the latter switch is closed which leaves the circuit open only at the scale switch. When the scale beam tips the scale switch closes, energizing magnet 99 which draws armature 101 toward it, unlatching arm 93, freeing loop 96 and releasing gate 51. The moment arm 93 has swung far enough to cause contact 94 to separate from contact 100, the circuit, which at that instant is closed at the scale switch, is broken and magnet 99 deenergized. Any sparking which occurs upon breaking the circuit therefore takes place between contacts 94 and 100. The switch comprising these contacts is therefore so designed that continued sparking in a dust laden atmosphere tending to form carbon will not affect its ability to make good contact free from resistance which would retard the unlatching of the gate by the magnet and so destroy the accuracy of weighing for the reasons given in explaining the requirements of automatic scales of this type.

This switch under discussion which may be termed the master or gate switch, is so combined with other parts of the mechanism as to result in a very simple yet highly efficient construction. It is noted that the gate holding mechanism comprising the stud 51a, loop member 96, shaft 95 and arm 93 has a circular movement about the axis of shaft 95. It is particularly because of the radial movement of arm 93 that it is utilized to carry one contact of the gate switch, namely contact 94. By utilizing a simple flat spring for the contact 100 which has its flat side parallel with the straight edge of contact 94 when the gate switch is closed, it necessarily results that as arm 93 revolves on its axis the contact is progressively opened from one side to the other. The flat spring may be bifurcated or otherwise constructed to provide two contact points. The action is illustrated in Figs. 12 and 13, Fig. 13 showing the contacts closed and Fig. 12 showing them just about to complete opening to break the circuit. As is clearly shown in Fig. 12, one of the contact points 100a breaks contact while the other point 100b keeps the circuit closed so that there can be no sparking between the point 100a and contact 94, with the result that point 100a will always be clean to make perfect electrical connection when the gate switch is closed. This principle of operation may of course be applied in other constructions instead of a single bifurcated spring such as contact 100.

A further advantage of incorporating the gate latch arm 93 in the switch structure is that it is desired to open the circuit to the magnet 99 as soon as possible after the gate is unlatched. The first part of the machine to move after the gate is unlatched is the arm 93 and therefore by also making it a part of the gate switch the circuit is closed for a minimum period of time and consumes a minimum amount of current.

In rapid weighing with an automatic machine the scale is subjected to various shocks which tend to set up vibrations which interfere with accurate weighing. There are at least two sources of such shocks, one being the slamming shut of the door 36 on the weighing receptacle 11 and the movement of the parts associated with it and the other being the dropping of the first charge of material into the weighing receptacle from the feeding hopper. Means are provided by this invention to prevent these troublesome vibrations with a view to increasing the speed with which the machine can operate with accuracy.

Referring to Figs. 2 and 15, the scale is equipped with the usual beam lock 120, pivotally mounted at 121 on the side of part 34 of member 20. The beam lock 120 is shown in full lines in its locking position, in which it is held by spring 124, and in dotted lines in its raised position. It is raised by the action of a cam 123 on the shaft 28. A cam roller 122 is provided on the end of the beam lock. Integral with the beam lock 120 is a step 125 to which is secured a light flat spring leaf 260. Thus the beam lock 120 and the spring 260 move together. The position of spring 260 is such that when the scale beam is locked down the spring 260 is pressing against the receptacle 11 and when the scale beam is free the spring is not touching the receptacle 11. This latter position will be referred to as the "released position". As the spring 260 rests on the receptacle 11, it is nowhere near the cams 43 which are in the planes of the levers 42. Spring 260 is therefore between the cams 43.

All of the various parts having now been described in detail the sequential operation of the machine as a whole may be explained. The cycle of operations will be assumed to begin at the point where a change of material has just been dumped from the weighing receptacle and the door on the receptacle is about to close, as shown in full lines in Fig. 15. The cam shaft 28 is revolving with the clutch engaged and the cut-off gate 51 is closed. Upon slight further rotation of shaft 28 the door 36 slams shut, the vibration being damped by spring 260. At or about the time the door 36 shuts gate 51 is pulled open and locked in that position, the machine being so timed that the shutting of door 36 is just completed before the charge of material strikes the receptacle 11. As the material strikes, any resulting shock is damped by spring 260. The shaft 28 continues to rotate from three-eighths to one-half of a complete revolution before cam 123 strikes roller 122 and raises the beam lock 120 during which time the receptacle 11 is filling. While the beam lock is still raised the clutch release lever 69 strikes the holding plate 70 and stops the rotation of shaft 28. Material continues to flow into the scale, which is now in released position, until it is overbalanced, whereupon the weight pan 13 rises, the scale switch closes thus energizing magnet 99 which unlatches gate 51 to stop the flow of material. Assuming the temporary stopping lever 75 to be depressed, the shutting of gate 51 releases lever 69 to engage the clutch. At the same time the gate switch opens and breaks the electric circuit. As soon as the clutch engages, shaft 28 begins to revolve; cam 123 releases the beam lock 120 which is pulled down by spring 124, raising spring 260 to steady the receptacle 11; and cam 43 simultaneously starts to open door 36 to discharge the material. When the material is all discharged the cycle is complete and is repeated.

Attention is called to certain points by way of summary. Shaft 28 makes one complete revolution of 360° during each cycle. The clutch is engaged and disengaged once during each cycle. The electrical circuit is closed only for an instant, from the time the scale switch closes until the time the gate switch opens. The scale beam is held by the beam lock and the scale receptacle held by spring 260 during the first part of the filling period, the proportion of the total period depending upon the rate of flow as adjusted by the slides 48. The scale beam is tipped only momentarily, from the time it closes the scale switch to the time shaft 28 has just started to revolve, which is the time it takes the mechanism to perform the following operations: (1) close the scale switch, (2) energize the magnet to trip gate 51, (3) free the clutch release lever 69, (4) engage the clutch, and (5) turn shaft 28 enough to release the beam lock 120. These operations take place almost instantaneously.

In the specification and claims the cooperation of the element 105 and the armature plate 101 (see Figs. 10 and 11) is referred to as a latching action. In the position of Fig. 10 the gate 51 is latched open by the abutment of the elements 101 and 105, while in the position of Fig. 11 the gate 51 is permitted to close by release of such latching arrangement.

Where manual control is necessary to release the latching arrangement 101—105 from the position as shown in Fig. 10, the projecting end of the rod 104 may be moved toward and against the resilient finger 103, to the position shown in Fig. 11 which will release the element 105 and permit it to move to the position of Fig. 11.

Similar manual control may also be had of the gate 51 which may be actuated manually by grasping the lug 51a, shown best in Figs. 1 and 5.

By the terms "radial approach", or "moving in the plane" utilized in the specification and claims is meant the contrasting movement of the contact element 100 and the contact element 94. It will be noted that the contact element 100 may move backwardly and forwardly in a plane without being subject to any offside or radial movement. On the other hand the movement of the contact element 94 is radial upon the axis 95.

I do not limit myself to the particular details of construction set forth in the foregoing specification and illustrated in the accompanying drawings, as the same refer to and set forth only one embodiment of the invention, and it is obvious that the same may be modified, within the scope of the apended claims, without departing from the spirit and scope of the invention.

Having thus described my invention, what I claim as new and desire to secure by Letters Patent is as follows:

1. In a weighing machine, a scale beam having a scale-pan associated therewith, a feeding hopper adapted to feed material into said scale pan, a control gate for the outlet of said feeding device, a first switch controlled by said scale-beam, an electro-magnetic relay device adapted to control the position of said control gate, said first switch controlling the circuit of said relay device, and a master switch comprising a contact member and a movable member, said master switch being controlled by said relay device and adapted to open the circuit of said relay device when the first switch is actuated to close the circuit of said relay device, said contact member including a plurality of contact elements connected to said circuit in electrical parallel, one of which contact elements will always first open before the other contact element, when the circuit of said relay device is opened.

2. In a weighing machine, a scale beam having a scale-pan associated therewith, a feeding hopper adapted to feed material into said scale pan, a control gate for the outlet of said feeding device, a first switch controlled by said scale-beam, an electro-magnetic relay device adapted to control the position of said control gate, said first switch controlling the circuit of said relay device, and a master switch comprising a contact member and a movable member, said master switch being controlled by said relay device and adapted to open the circuit of said relay device when the first switch is actuated to close the circuit of said relay device, said movable member being turnably mounted to swing into and out of contact with said contact member, said contact member being provided with a plurality of separated contact elements connected in said circuit in electrical parallel, one of said contact elements being connected so as to last separate from said movable member after the other contact element has separated, when said movable member moves out of contact with said contact member.

3. In a weighing machine, the combination with a supporting frame and a weighing scale pivotally mounted therein, of a hopper adapted to deliver material to be weighed into said weighing scale, a cut-off movably mounted with relation to the discharge opening of said hopper so as to control the flow of material therethrough, and means adapted to automatically alternately open and close said cut-off, comprising a spring for holding said cut-off in its closed position, a rotatable shaft for drawing said cut-off into its open position against the opposition of said spring, a movable stop for holding said cut-off in its open position, electromagnetic means for releasing said stop and allowing said cut-off to close, and devices for opening and closing the electric circuit of said electromagnetic means, said last-named devices comprising a terminal contact member forming part of the circuit, a rotatable shaft provided with a radially extending arm forming another part of the circuit, and means for operating said shaft and arm so as to cause said arm to contact with said first-named terminal contact member by a radial approach, said contact member having a plurality of separated contact elements, connected in electrical parallel, one of said contact elements by said radial approach being caused to last separate from said arm to open the circuit after the separation of the other contact element.

4. A device as set forth in claim 3, characterized by the fact that the first-named terminal member is desilient.

5. A weighing machine comprising a feed hopper, a first movable gate for said feed hopper, a closing device connected to said first gate for rapidly moving it to the closing position, a shaft, a one-way connection between said shaft and said gate so that the turning of said shaft moves said gate only to the open position and said connection leaves said closing device free to move said gate to the closing position, an actuating device for turning said shaft, a clutch for connecting said actuating device to said shaft, a scale, said scale having a receptacle for receiving material from said feed hopper, a second and normally closed movable gate for said receptacle, opening means actuated by said shaft for moving said second gate to the open position, a movable detent for holding said first gate in the open position when said detent is in its operative position, means for holding said detent in its operative position, an electro-magnetic device for releasing said detent, a first and circuit-closing switch actuated to close the circuit of said electro-magnetic device when said receptacle is moved under a predetermined load, a second and circuit-opening switch for opening the circuit of said electro-magnetic device, means for actuating said second switch so as to open said circuit substantially in unison with the movement of said first gate to the closing position, a control device for said clutch, and releasing means for releasing said control device and permitting said clutch to become operative, said releasing means being operated substantially in unison with the movement of said first gate to the closing position to effect the opening of the second gate.

6. A weighing machine comprising a feed hopper, a first movable gate for said feed hopper, a closing device connected to said first gate for rapidly moving it to the closing position, a shaft, a one-way connection between said shaft and said gate so that the turning of said shaft moves said gate only to the open position and said connection leaves said closing device free to move said gate to the closing position, an actuating device for turning said shaft, a clutch for connecting said actuating device to said shaft, a scale, said scale having a receptacle for receiving material from said feed hopper, a second and normally closed movable gate for said receptacle, opening means actuated by said shaft for moving said second gate to the open position, a movable detent for holding said first gate in the open position when said detent is in its operative position, means for holding said detent in its operative position, an electro-magnetic device for releasing said detent, a first and circuit-closing switch actuated to close the circuit of said electro-magnetic device when said receptacle is moved under a predetermined load, a second and circuit-opening switch for opening the circuit of said electro-magnetic device, means for actuating said second switch so as to open said circuit substantially in unison with the movement of said first gate to the closing position, a control device for said clutch, and releasing means for releasing said control device and permitting said clutch to become operative, said releasing means being operated substantially in unison with the movement of said first gate to the closing position to effect the opening of the second gate, said second switch including a stationary contact member and a movable contact member which is mounted on a rock shaft.

7. A weighing machine comprising a feed hopper, a rock shaft, a first movable gate for said feed hopper actuating said shaft, a spring connected to said first gate to move it to the closed position, a shaft, a one-way connection between said shaft and said gate so that the turning of said shaft moves said gate only to the open position and said connection leaves said spring free to move said gate to the closing position, an actuating device for turning said shaft, a clutch for connecting said actuating device to said shaft, a scale, said scale having a receptacle for receiving material from said feed hopper, a second and normally closed movable gate for said receptacle, opening means actuated by said shaft for moving said second gate to the open position, a movable detent for holding said first gate in the open position when said detent is in its operative position, means for holding said detent in its operative position, an electro-magnetic device for releasing said detent, a first and circuit-closing switch actuated to close the circuit of said electro-magnetic device when said receptacle is moved under a predetermined load, a second and circuit-opening switch for opening the circuit of said electro-magnetic device, said second switch including a pivoted arm which is actuated by said gate so that said arm is moved to the circuit opening position when the first gate is closed, said clutch having a turnable finger which holds said clutch inoperative when the turning of said finger is stopped, and a stop arm connected with said rock shaft and adapted to stop said finger, said stop arm being connected with said rock shaft by means which include a spring, said rock shaft being operative to move said stop arm to its inoperative position when the gate is closed.

8. An automatic weighing machine having an electrically released cut-off gate, a latch for said gate including an arm having an arcuate movement imparted to it when said gate closes, a circuit breaking switch comprising first contact means carried by said arm and following its arcuate movement, and second contact means resiliently urged toward said first contact means and being capable of non-pivoting backward and forward movement by reason of its resiliency and having separated contact members connected in electrical parallel, whereby by reason of said arcuate movement one of said contact members is always separated from said first contact means before the other contact member is separated from said first contact means.

9. In an automatic weighing machine, a scale with a receptacle, a feed device to feed material into said receptacle, a cut-off gate to control said device, a continuously running driving member, a rotatable shaft, a clutch to connect said member and said shaft and having a release finger rotatable with said shaft and adapted to disengage said clutch when the rotation of said finger is stopped, wherein the rotation of said shaft opens said cut-off gate to allow material to flow into said scale, means for stopping the operation of the machine comprising a lever actuated by said shaft to open said gate, a stop carried by said lever to engage said finger when said gate is open, means for closing the gate upon balance of said scale and means for holding said stop in engagement with said finger while permitting the gate to close.

10. In an automatic weighing machine, a scale with a receptacle, a feed device to feed material into said receptacle, a cut-off gate to control said device, a continuously running driving member, a rotatable shaft, a clutch to connect said member and said shaft and having a release finger rotating with said shaft and adapted to disengage said clutch when the rotation of said finger is stopped, wherein the rotation of said shaft opens said cut-off gate to allow material to flow into said scale, means for stopping the operation of the machine comprising a lever actuated by said shaft to open said gate, a stop carried by said lever to engage said finger when said gate is open, means for closing the gate upon balance of said scale and means for holding said stop in engagement with said finger while permitting the gate to close, the engaging of said holding means being prevented except when said gate is open.

11. An automatic weighing machine comprising a scale, a material-receiving receptacle therefor, means for discharging material to said receptacle, structure movable to allow or obstruct passage of material to said receptacle from said means, driving and driven clutch members, a source of power for driving said driving clutch member, means operable upon balance of said scale to effect engagement of said clutch members, mechanism operable after predetermined movement of said clutch members to effect their disengagement, and control means for said structure comprising a solenoid-controlled catch, a switch for said solenoid operated upon balance of said scale to trip said catch, and means including said driven clutch member for resetting said catch.

12. A weighing machine comprising a feed chute, a first movable gate for said feed chute, a closing device connected to said first gate for rapidly moving it to the closing position, a shaft, a one-way connection between said shaft and said gate so that the turning of said shaft moves said gate to the open position, an actuating device for turning said shaft, a clutch for connecting said actuating device to said shaft, a scale, said scale having a receptacle for receiving material from said feed chute, a second and normally closed movable gate for said receptacle, opening means actuated by said shaft for moving said second gate to the open position, a movable detent for holding said first gate in the open position when said detent is in its operative position, means for holding said detent in its operative position, an electro-magnetic device for releasing said detent, a first and circuit-closing switch actuated to close the circuit of said electro-magnetic device when said receptacle is moved under a predetermined load, a second and circuit-opening switch for opening the circuit of said electromagnetic device, means for actuating said second switch so as to open said circuit substantially in unison with the movement of said first gate to the closing position, a control device for said clutch, and releasing means for releasing said control device and permitting said cutch to become operative, said releasing means being operated substantially in unison with the movement of said first gate to the closing position to effect the opening of the second gate.

WILLIAM J. BECK.